Nov. 8, 1932.  C. SMITH ET AL  1,886,448
FURNACE
Filed July 15, 1930  2 Sheets-Sheet 1

Inventor
Calvin Smith,
Reuben T. Southwick,
By Mason & Mason
Attorneys

Nov. 8, 1932.   C. SMITH ET AL   1,886,448
FURNACE
Filed July 15, 1930   2 Sheets-Sheet 2

Inventor
Calvin Smith,
Reuben J. Southwick,
By Mason & Mason
Attorneys

Patented Nov. 8, 1932

1,886,448

UNITED STATES PATENT OFFICE

CALVIN SMITH AND REUBEN J. SOUTHWICK, OF SOMERVILLE, NEW JERSEY

FURNACE

Application filed July 15, 1930. Serial No. 468,095.

This invention relates particularly to furnaces which are adapted to burn gas or other fluid fuel, or which employ electrical heating means for heating fluids such as water, which is conducted by suitable pipe connections to a place or places of use.

An object of this invention is to provide a furnace using gas, oil, or any other suitable kind of fuel, or electrical heating devices, for economically heating buildings or for supplying hot water for domestic use.

Another object of the invention is to provide a furnace which utilizes practically all of the B. t. u.'s supplied by the burner, or other heater.

A further object of the invention is to provide a furnace having a return water line connected to a return water chamber in the base of the furnace, and a water drum having an elongated skirt portion with connections from the return water chamber to the heating coil or coils and other connections to the skirt portion of the drum.

Other objects will appear hereinafter throughout the specification.

Figure 1:
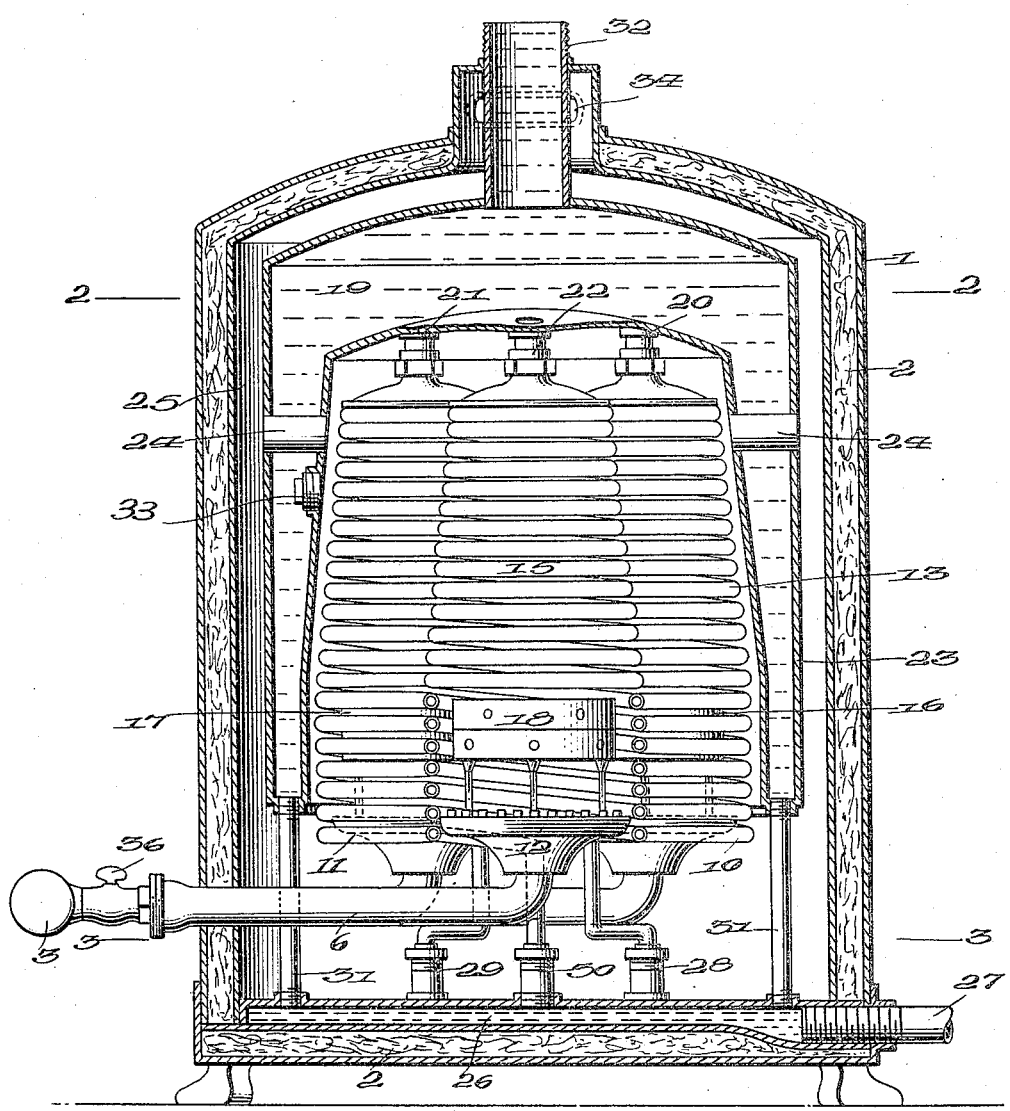
Fig. 1 is a vertical section of a furnace embodying our invention.
Figure 2:
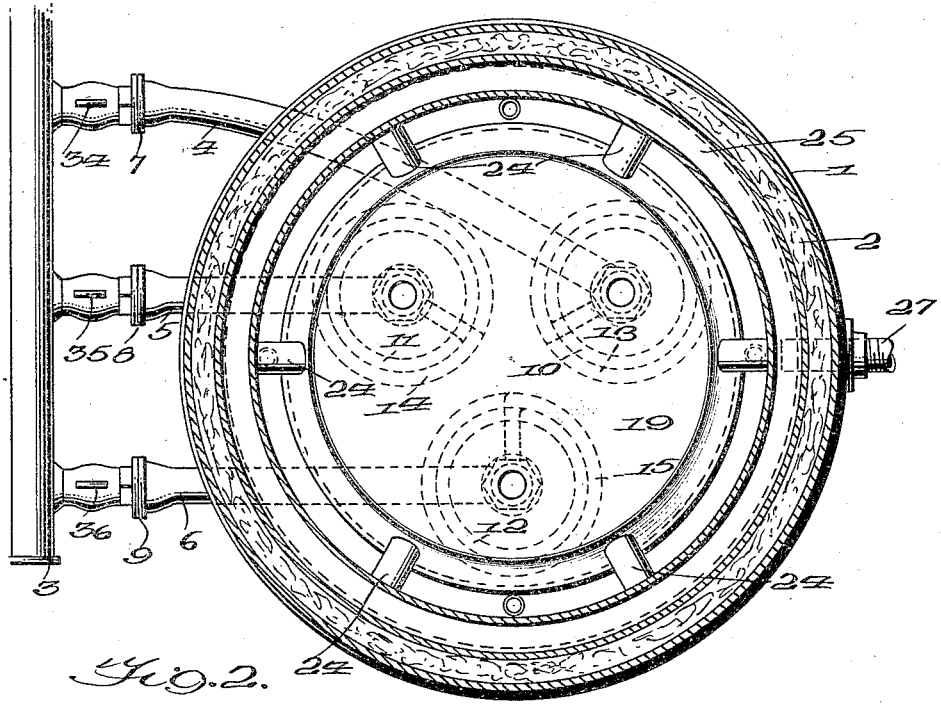
Fig. 2 is a horizontal section taken on the line 2—2 of Fig. 1.
Figure 3:
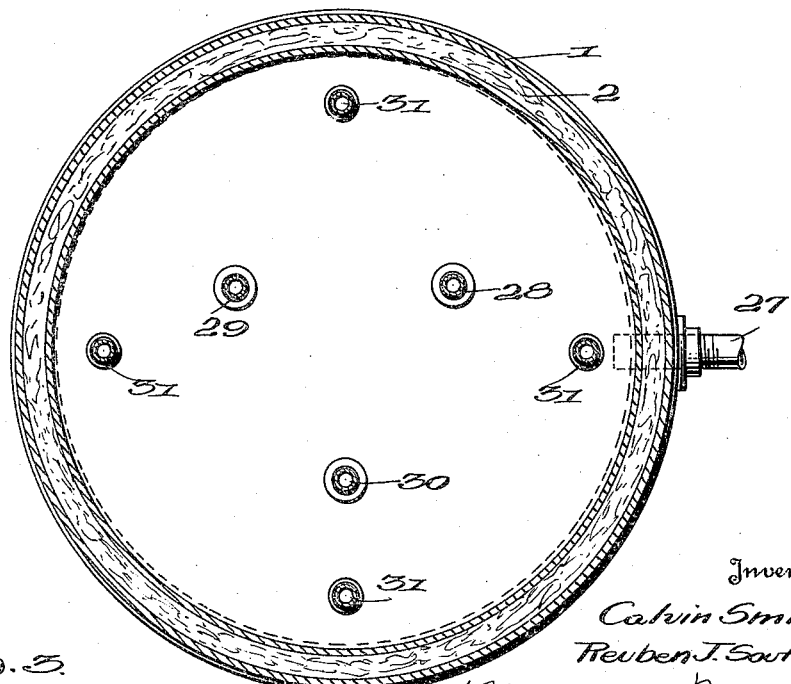
Fig. 3 is a horizontal section taken on the line 3—3 of Fig. 1.

The term furnace is used throughout the specification and in the claims to designate any heating unit such as a furnace, hot water heater or other heater for supplying a heating liquid such as water for any purpose for which the same may be used.

In the drawings, the numeral 1 indicates the shell or casing of the furnace which has a suitable heat insulated lining 2. The numeral 3 in the present instance indicates a gas or other fuel manifold for supplying fuel to the fuel inlets 4, 5 and 6. The numerals 7, 8 and 9 designate air inlets which are adapted to supply air to be mixed with the fuel on its way to the burners 10, 11 and 12. Located above each of the burners 10, 11 and 12 respectively, are heating coils 13, 14 and 15.

Immediately above the burners are suitably supported ceramic radiants 16, 17 and 18. We prefer to construct and locate the radiants as shown in patent to John Hicks No. 1,414,360, dated May 2, 1922. Surrounding the coils, radiants, and burners, is a water containing drum 19 to which the top of the coils 13, 14 and 15 are connected respectively by unions 20, 21 and 22. The drum 19 has a lower skirt portion 23 which portion surrounds the coils, radiants and burners. Outlets 24 through the upper portion of the skirt conduct the heated air or gases to an outer space 25, whence they are led to the flue 34 which is connected to a suitable outlet, such as a chimney, not shown.

Located in the base of the furnace is a flat return water chamber 26 which covers practically the entire bottom portion of the furnace and which has a return water pipe connection 27, by which the cooled water is admitted to the return water chamber. Suitable pipe connections indicated by the reference numerals 28, 29 and 30, connect the return water chamber 26 with the coils 13, 14 and 15.

In the base of the skirt of the drum are located any suitable number of pipe connections 31. The drawings show four of these pipe connections, but any suitable number may be employed. In the top of the drum is an outlet 32 for the heated water, which may be connected to the radiators located in different rooms of the house or other building it is desired to heat, or connected to other devices for use, such as shower baths, tubs, etc.

We prefer to connect into the hot water line at any suitable point a thermostat 33 to control the heat supplied to the burner, in order that the amount of heated water supplied by the furnace may be automatically controlled. The thermostat may be attached to any part, such as the drum, as illustrated in Fig. 1 of the drawings. We have shown in the drawings, three coils, separate inlets for fuel to individual burners and one inlet and one outlet connection to each of the coils, but it will be understood that any number of coils and connections, and any number of burners or electrical heaters may be provided. It is also to be understood that a single connection may be provided for fuel for all of the burners, instead of the separate connections shown. The numerals 34, 35 and 36 indicate valves whereby the amount of fuel admitted to each burner may be manually regulated. Under such conditions, it will be recognized, and especially where it is desired to run the furnace with a low heat, that one or more of the valves may be closed, thus utilizing the heat of the other burner or burners only to heat the water.

The connections 31 from the lower part of the skirt portion of the drum materially increase the efficiency of the furnace by returning to the return water chamber any water which is cooler than that in the return water chamber, thereby tending to increase the circulation of the water and preventing the formation of "dead water pockets". It will be apparent that when the burner or other heating means is started up as by the thermostat, after being inactive for some time, that cool water will be supplied to the coils from the water chamber 26 which draws the cooled water not only from the return water pipe 27, but also from the base of the skirt portion through pipes 31, thus maintaining a free circulation of water. The drum 19 and skirt 23 present a large exposed surface on both sides thereof to be heated by the burners, and thereby greatly add to the efficiency of the furnace by applying practically all of the heat not absorbed by the water coils 13, 14 and 15, to the water in the drum 19, so that the heated gases which pass out through the flue 34 are comparatively cool. The provision of the connections 31 insure passage of the water from the skirt to the return water chamber 26 when the water in the skirt portion is hotter than that in the return water chamber, and conversely (under some conditions) allow passage of some of the water in the return water chamber to pass to the skirt portion of the drum 19 when the water in the skirt portion is cooler than that in the return water chamber 26. This latter condition may occur under some conditions of use.

It will be noted that by our improved construction, as illustrated in the drawings, the drum 19 is heated on its interior, as well as on its exterior, by the heated gases of the burners, or other heating means employed. The radiants absorb heat from the burners and radiate the heat units absorbed to the water in the coil and to the skirt portion of the drum. The outer casing 1 is comparatively cool as the fire is completely surrounded by the water coils and drum.

It is to be understood that we desire not to be limited in the practice of our invention to the construction and arrangement of parts illustrated in the accompanying drawings, but desire to comprehend within the scope of our invention all embodiments as defined by the accompanying claims.

Having thus described our invention, what is claimed is:—

1. A water heater consisting of an outside casing, a water chamber having a unitary top and side portions, said side portions forming an elongated depending skirt portion spaced from the top and sides of said casing, and providing a dome shaped interior space open at the bottom, a burner located in said dome shaped space, a water coil located in said dome shaped space, said coil having its upper portion provided with a connection to said water chamber, a return water chamber located below said first named water chamber, burner and coil having a connection to a return water pipe, a conduit connecting said water coil to said return water chamber, and a plurality of conduits arranged to connect to the skirt portion of said water chamber first named on opposite sides to allow water to circulate from the return chamber to the lower portion of said skirt portion or vice versa and forming the supports for said first named water chamber.

2. A water heater consisting of an outside casing, a water chamber having a unitary top and side portions, said side portions forming an elongated depending skirt portion spaced from the top and sides of said casing, and providing a dome shaped interior space open at the bottom, a burner located in said dome shaped space, a water coil located in said dome shaped space, said coil having its upper portion provided with a connection to said water chamber, a return water chamber located below said first named water chamber, burner and coil and having a connection to a return water pipe, a conduit connecting said water coil to said return water chamber, and a plurality of circularly arranged vertical conduits arranged to connect to the skirt portion of said water chamber first named to allow water to circulate from the return chamber to the lower portion of said skirt portion or vice versa and forming the supports of said first named water chamber.

3. A water heater consisting of an outside casing, a water chamber having a unitary top and side portions, said side portions forming an elongated depending skirt portion spaced from the top and sides of said casing, and providing a dome shaped interior space open at the bottom, a burner located in said dome shaped space, a water coil located in said dome shaped space, said coil having its upper portion provided with a connection to said water chamber, a return water chamber located below said first named water chamber, burner and coil and having a connection to a return water pipe, a conduit connecting said water coil to said return water chamber, and a plurality of conduits arranged to connect to the skirt portion of said water chamber first named to the return water chamber adjacent the periphery thereof to allow water to circulate from the return water chamber to the lower portion of the skirt portion or vice versa and forming the supports for said first named water chamber.

4. A water heater consisting of an outside casing, a water chamber having a unitary top and side portions, said side portions forming an elongated depending skirt portion spaced from the top and sides of said casing, and providing a dome shaped interior space open at the bottom, a burner located in said dome shaped space, a water coil located in said dome shaped space, said coil having its upper portion provided with a connection to said water chamber, a return water chamber located below said first named water chamber, burner and coil and having a connection to a return water pipe, a conduit connecting said water coil to said return water chamber, and a plurality of conduits arranged to connect to the skirt portion of said water chamber first named to allow water to circulate from the return chamber to the lower portion of said skirt portion or vice versa and forming the supports for said first named water chamber, and means for conducting heated gases from the dome shaped interior through said first named water chamber to the space between the outside casing and said first named water chamber.

5. A water heater consisting of an outside casing, a water chamber having a unitary top and side portions, said side portions forming an elongated depending skirt portion spaced from the top and sides of said casing, and providing a dome shaped interior space opened at the bottom, a burner located in said dome shaped space, a water coil located in said dome shaped space, said coil having its upper portion provided with a connection to said water chamber, a return water chamber located below said first named water chamber, burner and coil and having a connection to a return water pipe, a conduit connecting said water coil to said return water chamber, and a plurality of conduits arranged to connect to the skirt portion of said water chamber first named to allow water to circulate from the return chamber to the lower portion of said skirt portion or vice versa and forming the supports for said first named water chamber, said skirt portion having interior and exterior converging walls, the space between said walls gradually narrowing from top to bottom to form a water space having its largest area adjacent the top of the skirt and its smallest area adjacent the bottom thereof.

In testimony whereof we have hereunto set our hands.

CALVIN SMITH.
REUBEN J. SOUTHWICK.